(12) United States Patent
Vantrease

(10) Patent No.: US 9,511,534 B2
(45) Date of Patent: Dec. 6, 2016

(54) THERMOFORMING APPARATUS HAVING ADJUSTABLE LENGTH LOAD SHAFTS AND METHOD

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 858 days.

(21) Appl. No.: 13/676,003

(22) Filed: Nov. 13, 2012

(65) Prior Publication Data
US 2013/0122130 A1    May 16, 2013

Related U.S. Application Data

(60) Provisional application No. 61/559,212, filed on Nov. 14, 2011.

(51) Int. Cl.
  *B29C 51/18* (2006.01)
  *B29C 51/08* (2006.01)
  *B29C 51/38* (2006.01)

(52) U.S. Cl.
  CPC ............. *B29C 51/18* (2013.01); *B29C 51/082* (2013.01); *B29C 51/38* (2013.01); *B29C 2791/006* (2013.01); *B29C 2791/007* (2013.01)

(58) Field of Classification Search
  USPC ....................................................... 425/150
  See application file for complete search history.

(56) References Cited

U.S. PATENT DOCUMENTS

| | | | |
|---|---|---|---|
| 5,002,479 A * | 3/1991 | Brown | B29C 33/20 100/257 |
| 6,382,953 B1 * | 5/2002 | Chun | B29C 51/262 425/171 |
| 2009/0051073 A1 | 2/2009 | Irwin | |

FOREIGN PATENT DOCUMENTS

| | | |
|---|---|---|
| EP | 0953427 A1 | 11/1999 |
| JP | 06143402 | 5/1994 |
| JP | 2007-230009 | 9/2007 |

OTHER PUBLICATIONS

PCT/US2012/064891 IPRP, May 20, 2014, Irwin Research & Development.

(Continued)

*Primary Examiner* — Jacob Thomas Minskey
(74) *Attorney, Agent, or Firm* — Wells St. John P.S.

(57) ABSTRACT

A thermoforming machine is provided having a load shaft end adjustment apparatus. The thermoforming machine load shaft end adjustment apparatus includes a load shaft, a backlash nut, a height adjustment nut, a collar, and at least one fastener. The load shaft has a threaded end segment and an axially extending key slot. The backlash nut is threaded onto the end segment. The height adjustment nut is threaded onto the end segment adjacent the backlash nut. The collar is configured to receive the height adjustment nut for rotation, having a key configured to be received within the key slot, and is configured to be mounted onto a platen of the thermoforming machine. At least one fastener extends between the backlash nut and the collar and is configured to secure together the backlash nut and collar with the height adjustment nut interposed there between. A method is also provided.

20 Claims, 15 Drawing Sheets

(56) References Cited

OTHER PUBLICATIONS

PCT/US2012/064891 Srch Rpt., Apr. 26, 2013, Irwin Research & Development.
PCT/US2012/064891 Wrtn. Opn., Apr. 26, 2013, Irwin Research & Development.

* cited by examiner

THERMOFORMING APPARATUS HAVING ADJUSTABLE LENGTH LOAD SHAFTS AND METHOD

CROSS REFERENCE TO RELATED APPLICATION

This application claims priority to U.S. Provisional Patent Application Ser. No. 61/559,212 which was filed on Nov. 14, 2011, the entirety of which is incorporated by reference herein.

TECHNICAL FIELD

The disclosure pertains generally to thermoforming apparatus. More particularly, this disclosure relates to thermoforming machines having adjustable length load shafts for securing together opposed platens and dies of a thermoforming apparatus.

BACKGROUND OF THE INVENTION

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure and/or vacuum generates very large loads on the kinematic drive linkages and frame of a thermoforming machine. Improvements are needed in order to enable forming using very large loads without requiring further increases in the size and strength of traditional frames and linkages of a thermoforming machine, particularly when forming newer plastic sheet materials and/or article geometries that require greater forming pressures and loads.

SUMMARY OF THE INVENTION

A thermoforming machine is provided with a plurality of load shaft end adjustment assemblies. Each load shaft is adjustable in length using the respective load shaft end adjustment assemblies to enable alignment of the mating mold surfaces on respective platens of a thermoforming machine when in a locked, closed position, providing for the capability of handling increased thermoforming pressures on the thermoforming machine during a thermoforming operation. A preload can be applied to the end adjustment assemblies in order to prevent damage to mating threaded assembly components due to platen forming loads.

According to one aspect, a thermoforming machine load shaft length adjustment apparatus is provided. The apparatus includes a load shaft, a structural support, a length adjustment nut, a collar, and at least one fastener. The load shaft has a threaded segment, and is configured to engage between a pair of thermoforming platens of a thermoforming machine and carry forming loads between the pair of platens during a thermoforming operation. The structural support is provided on the load shaft proximate the threaded segment. The length adjustment nut is threaded onto the threaded segment of the load shaft proximate the structural support and is movable to effect length adjustment of the load shaft as engaged between the pair of platens. The collar is mounted onto a platen of the thermoforming machine and is configured to receive the length adjustment nut for relative rotation. At least one fastener extends between the structural support and the collar and is configured to secure together the structural support and the collar with the length adjustment nut interposed there between and engaged in threaded relationship to impart a preload that urges the height adjustment nut against the collar that is greater than a load received by the load shaft as thermoforming pressure is applied between the platens.

According to another aspect, a length-adjustable thermoforming machine load shaft apparatus is provided having a load shaft, a load-bearing support, an adjustment nut, a collar, and a preload fastener. The load shaft has a threaded segment and spaced-apart engagement portions for releasably engaging together a pair of thermoforming platens of a thermoforming machine and is operative to carry pneumatically-induced thermoforming loads imparted between forming dies on the pair of platens during a thermoforming operation. The load-bearing support is provided on the load shaft proximate the threaded segment. The adjustment nut is threaded onto the threaded segment proximate the load-bearing support and is movable to effect length adjustment of the load shaft as engaged between the pair of platens. The collar is mounted onto a platen of the thermoforming machine and is configured to mate in engagement with the adjustment nut. The preload fastener extends between the structural support and the collar and is configured to draw together the structural support and the collar so as to urge the collar into engagement with the adjustment nut so as to preload threads on the adjustment nut with complementary threads on the load shaft such that the resulting preload is greater than a load received by the load shaft as forming pressure is applied between the platens.

According to yet another aspect, a method is provided for adjusting lengths of load shafts on a platen of a thermoforming apparatus. The method includes providing: a first platen with a first die mold, a second platen with a second die mold, a drive linkage for moving together and apart the first platen and the second platen, and a plurality of load shafts extending between the first platen and the second platen operative to secure together under thermoforming loads the first die mold and the second die mold during a thermoforming operation; urging together the first platen and the second platen such that the first die mold and the second die mold are held together in engagement; ascertaining any loose fit-up along respective die surfaces between the first die mold and the second die mold; and adjusting length on one of the load shafts to eliminate the ascertained loose fit-up between the first die mold and the second die mold when the die molds are held together in engagement.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
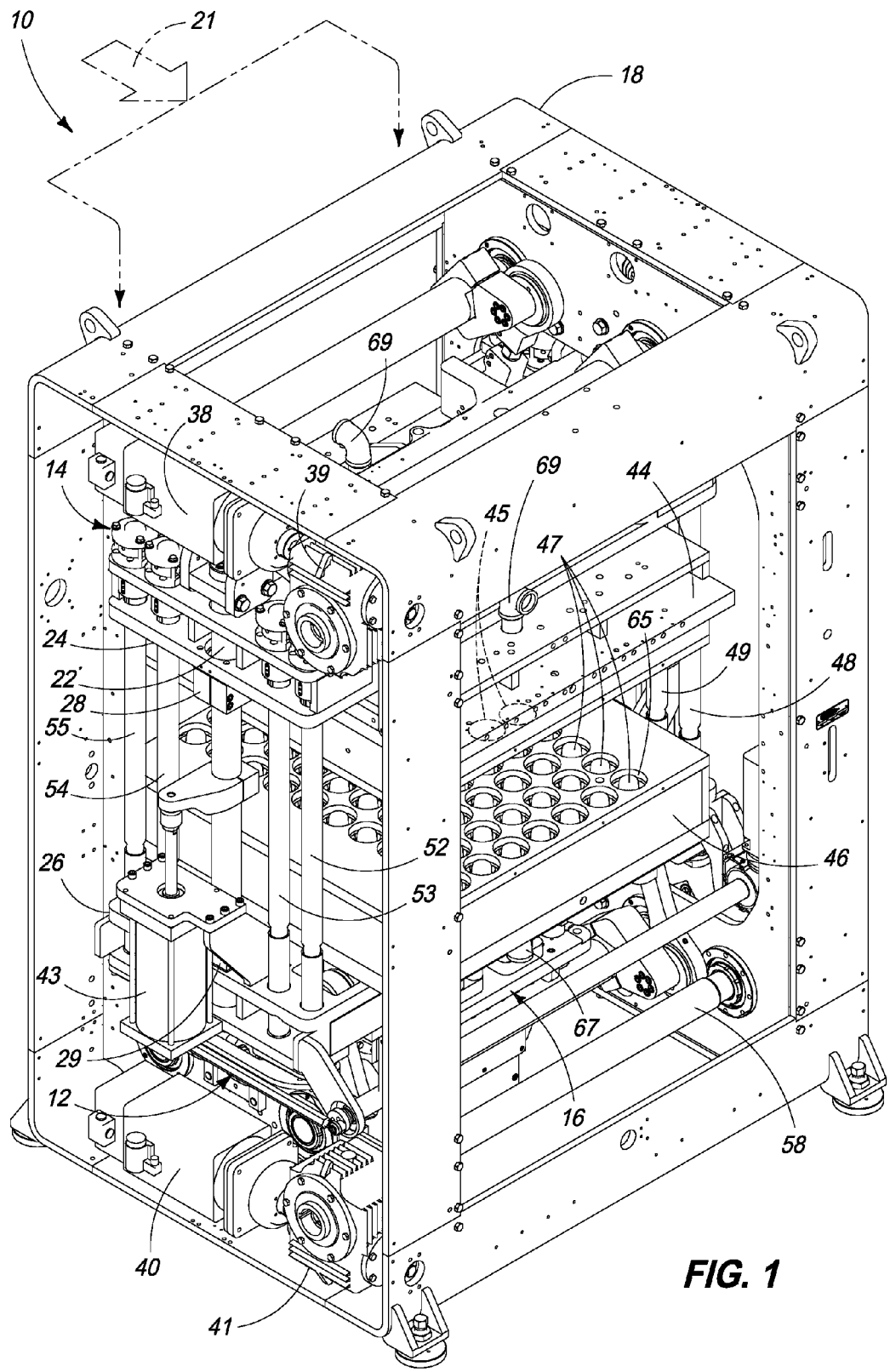
FIG. 1 is a perspective view from above of a thermoforming machine with a platen lock assembly taken from a drive motor side in accordance with an embodiment.
Figure 2:
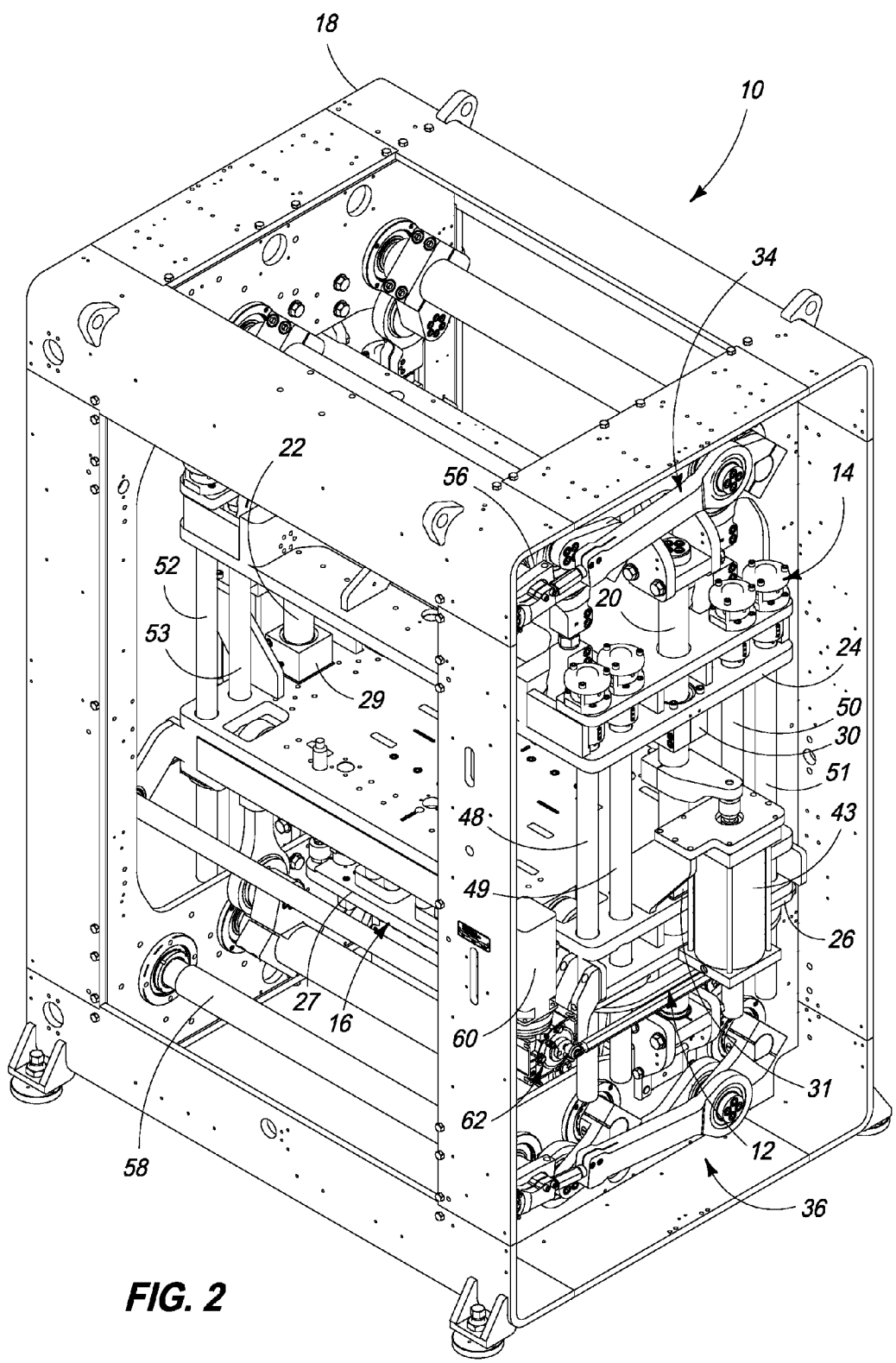
FIG. 2 is a perspective view from above of the thermoforming machine of FIG. 1 taken from a kinematic drive linkage side, and with the die plates removed.

Attention is now directed towards embodiments of the device. FIGS. 1 and 2 are left and right perspective views illustrating a thermoforming machine 10 with a platen lock assembly 12 and a load shaft end adjustment apparatus 14 in accordance with an embodiment. More particularly, thermoforming machine 10 includes a structural frame 18, stationary die posts 20 and 22 supported by frame 18, an upper platen 24, and a lower platen 26. Upper platen 24 and lower platen 26 are supported for vertical reciprocation via pairs of bronze bushings 28, 29 and 30, 31, respectively. A kinematic drive linkage drives upper platen 24 and lower platen 23 using upper kinematic linkage assembly 34 and lower kinematic linkage assembly 36, respectively, each driven by a respective servo motor 38 and 40 (see FIG. 1) via gearboxes 39 and 41, respectively. A third motion platen, or assist platen 16 is supported for movement relative to lower platen 26 by bushings that slide over respective die posts.

A set of platen load shafts 48-51 and 52-55 are provided on either side of mold plates, or die plates 44 and 46, extending between upper platen 24 and lower platen 26. More particularly, platen lock assembly 12 comprises set of shafts 48-51 attached to platen 24 along a top end and lock plate assemblies 70 and 71 (see FIG. 9), as well as set of shafts 52-55 attached to platen 24 along a top end and lock plate assemblies 72 and 73 (see FIG. 13). A top end of each shaft 48-55 is mounted in vertically, or axial lengthwise adjustable relation relative to top platen 24 with an adjustable rod end assembly 14, thereby enabling adjustment of each shaft when locked to lock plate assemblies 70-73 to obtain uniform engagement and fit-up between contact surfaces (and realize a pneumatic seal) between upper die plate 44 and lower die plate 46 when brought together and locked via platens 24 and 26. According to one construction, load shafts 48-55 are constructed from pre-heat treated 4140 steel, having 40 Rockwell C-scale hardness. Backlash nut 114 and adjustment nut 116 are also constructed from heat treated 4140 steel, having 40 Rockwell C-scale hardness, also according to one construction. Shafts 48-55 and nuts 114 and 116 can alternatively be made from any suitable structural material, such as any steel, composite, or other suitable structural load-bearing material.

As shown in FIG. 2, third motion platen 27 of plug assist drive assembly 16 is carried for reciprocating movement relative to lower platen 26 on an array of drive shafts (not shown). Optionally, features of the present lock rods can be implemented on a thermoforming machine that does not use a third motion platen.

As shown in FIG. 1, upper kinematic linkage assembly 34 and lower kinematic linkage assembly 35 cooperate to drive upper and lower platens 32 and 34, respectively. Respective modern rotary electric servo drive motors 38 and 40 (see FIG. 2) independently drive linkages 34 and 36 via gearboxes 39 and 41 to reciprocate platens 24 and 26 respectively. Such motors are driven by a computer control system, as is presently understood in the art. Linkage position information can also be implemented on the gearboxes using electric position sensors (not shown) that send signals to the control system in order to validate absolute position of respective kinematic linkages. Other kinematic linkages and drive motor arrangements can be used in the alternative.

Figure 3:
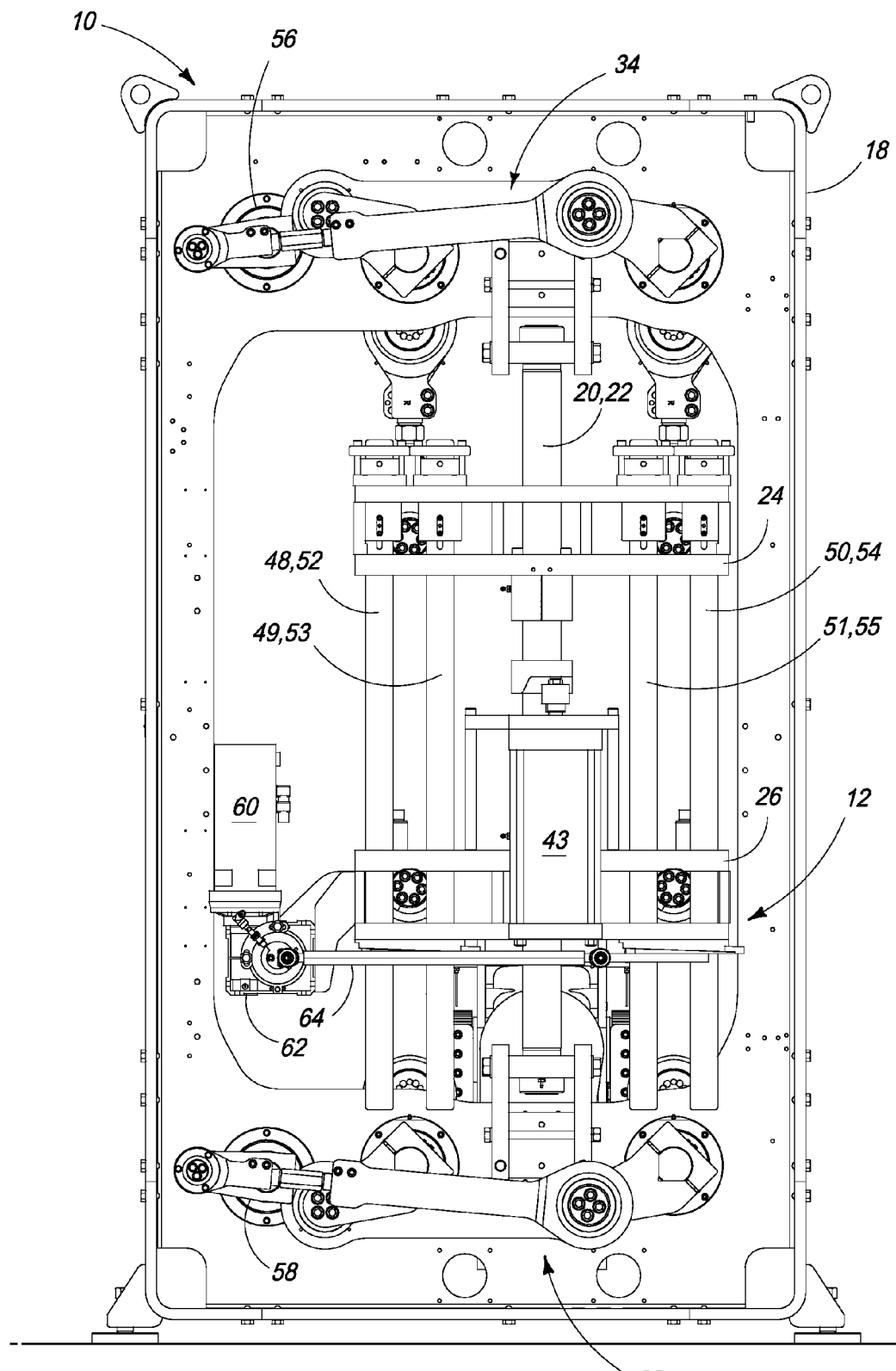
FIG. 3 is an elevational side view of the thermoforming machine of FIGS. 1-2 showing the upper and lower platens locked together in a fully closed position (but with the forming die plates omitted).

More particularly, kinematic linkages 34 and 36 of FIG. 3 each comprise drive linkages that are formed from a pair of top and bottom crank arm assemblies, respectively. Each assembly is formed from a crank arm linkage and a four-bar linkage. The crank arm linkage drives the four-bar linkage in an oscillating motion. Each kinematic linkage 34 and 36 is driven via servo motor 38 and 40 and respective gearbox 39 and 41 through a rotary cross shaft 56 and 58, respectively. Each platen 24 and 26 is driven by kinematic linkage 34 and 36, respectively, in substantially non-rotating linear, vertical motion. Guide posts 20 and 22 further limit such motion to vertical reciprocating motion. This vertical reciprocating motion causes co-acting engagement of female cavities, or female dies 45 in an upper die plate 44 mounted on the upper platen 24 with mating male dies or plugs 47 in a lower die plate 46 mounted on the lower platen 26 on opposed sides of thermoformable web, or sheet 21 (see FIG. 1). In some constructions, a resilient rubber seal is provided around the cavities and plugs and between the die plates. In other constructions, a heated sheet of thermoformable web provides a seal between the die plates.

More particularly, each drive system, including the motor and associated drive controller, forms the motor of an associated rotary press. This rotary press attaches to a rotating crank arm assembly that moves the associated four-bar linkage. The linkage causes the attached platen to move up and down in response to rotation of the drive. Accordingly, a single revolution of shafts 56 and 58 caused by drive motors 38 and 40 and gearboxes 39 and 41 will produce a corresponding complete press cycle of both the upper and lower platens 24 and 26, respectively. Hence, a complete cycle of each drive will return the press to a starting, or closed position. For example, when lower drive motor 40 is at an initial rotated position of zero degrees, the lower platen 26 is closed, or upwardly raised against the thermoformable sheet, or web. Similarly, when lower driven motor 40 is rotated to 180 degrees, the lower platen 26 is lowered, or completely opened. Likewise, the same holds true for upper drive motor 38 and upper platen 24.

A control system is configured to move upper platen 24, lower platen 26, and third motion, or plug assist platen 27 via respective servo motors, such as servo motors 38, 40. According to one construction, upper platen 24 and lower platen 26 are each drive platens, and plug assist platen 27 is also a moving platen. The control system includes a controller comprising processing circuitry and memory configured to precisely regulate motion of platens 24, 26 and 27 in desired, timed synchronization such that individual plugs, or male dies 47 are driven upwardly with a greater combination of speed and force than would be capable by merely moving platens 24 and 26 together. In operation, platens 24 and 26 are driven together into a heated web of thermoformable material that is captured between upper platen 24 and lower platen 26 during a thermoforming operation.

According to FIG. 1, a seal 65 is provided around each male plug 47, while a vacuum is applied to the bottom of mold plate 44 (top of the thermoformable web) via a vacuum source through vacuum ports 69, and pneumatic form pressure is applied along the top of mold plate 46 (bottom of the thermoformable web) to help form the web. However, this generates considerable loads, which are countered by using platen lock assembly 12. For the case of some mold designs, an entire periphery along top surface of mold plate 46 is encircled by a seal, which generates considerable loads when vacuum and pressure are applied to respective top and bottom surfaces of a thermoformable web, or sheet 21. Third motion platen 27 is subsequently moved upwardly relative to moving platen 26, so as to cause forming of a thermoformed article in a heated plastic web between each individual pair of complementary male plugs 47 and female die cavities 45, while platen lock assembly 12 is locked.

As shown in FIG. 1, numerous rows of complementary, interacting male plugs 47 and female die cavities 45 are provided in die plates 46 and 44 affixed to respective platens 26 and 24, respectively. Subsequently, platens 24, 26 and 27 are withdrawn, or retracted apart in order to start the cycle all over again, and third motion platen 27 is lowered relative to lower platen 26. The cyclical process is then repeated.

Preferably, a modern rotary electric servo drive motor, or actuating device, is used for drive motors 15 and 17 (see FIG. 2). Such a drive includes an AC servo motor and an associated servo drive motor controller. For example, one suitable AC motor is sold by Siemens AG, Automation Group, Automation Systems for Machine Tools, Robots and Special-Purpose Machines, P.O. Box 31 AD, D-91050, Erlangen, Federal Republic of Germany. Additionally, one suitable servo drive motor controller is sold by Siemens as an analog feed drive system including the SIMO DRIVE 611-A Transistor PWM Inverters and Motors for AC FV Drives. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive. Furthermore, one suitable servo drive motor used for servo drive motor 58 is also a Siemens AC servo motor, model number 1FT5132-OSC71-1-ZH27, also available from Siemens AG. Automation Group, Automation Systems for Machine Tools, Robots and Special-Purpose Machines, P.O. Box 31 AD, D-91050, Erlangen, Federal Republic of Germany.

As shown in FIG. 2, plug assist drive assembly 12 reciprocates third motion platen 36 up and down relative to lower platen 34. Platen 36 is guided for axial reciprocation by a rectangular array of bronze bushings 28-31, each contained within a housing, that are slidably received over respective cylindrical die posts 24-27 mounted rigidly to lower platen 34. Optionally, plug assist drive assembly 12 can be mounted to upper platen 32, with the third motion platen being driven in a downward direction while the upper platen is being driven downwardly. Further optionally, a third motion platen can be mounted to a stationary platen, when an opposing platen is moved to and fro. Further optionally, a third motion platen can be mounted for horizontal movement relative to a moving platen from a pair of opposed moving platens that move together and apart along a horizontal direction. Finally, a third motion platen can be affixed to any one of a pair of platens that move together and apart along a contact plane in any angular orientation.

Figure 4:
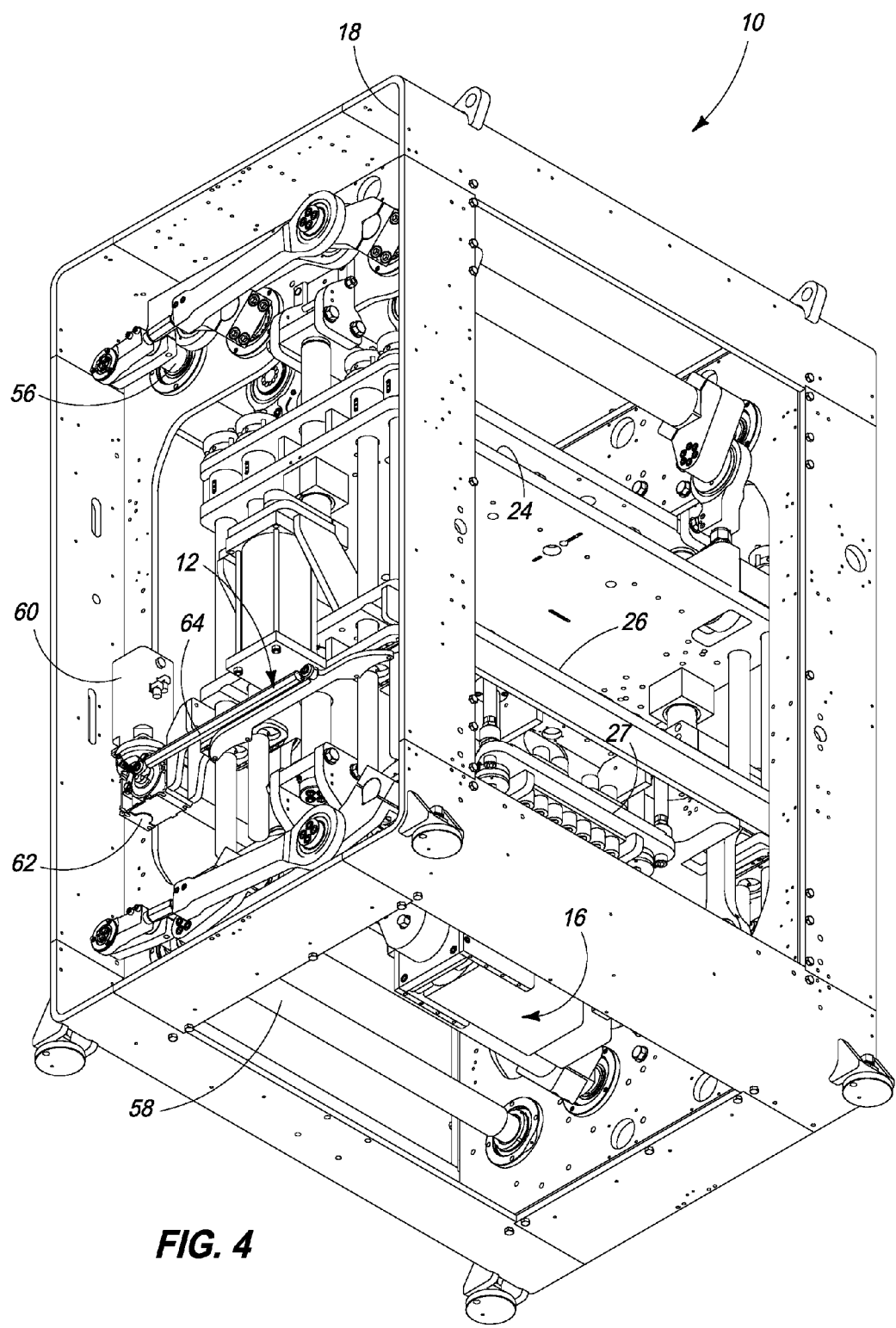
FIG. 4 is a perspective view from below of the thermoforming machine of FIGS. 1-3 taken from a kinematic drive linkage side.

As shown in FIGS. 3-4, a servo motor 60 drives a cross shaft 61 via a gearbox 62, using a connecting rod 64 that is eccentrically mounted onto each end of cross shaft 61 to drive a respective drive bar 74 and 75 (see FIG. 5) to-and-fro so as to lock and unlock platen lock assembly 12. Accordingly, load shafts 48-55 of FIG. 3 lock together platens 24 and 26 while vacuum and pressure are respectively applied to top and bottom surfaces of a thermoformable web presented between respective mold plates (see FIG. 1). For example, a pneumatic differential pressure of 120 PSI can be imparted between die plates 44 and 46 (see FIG. 1) where the sealed area between die plates 44 and 46 is 50" by 50", which imparts 150 tons of load on load shafts 48-55 during forming of the web. A pneumatic cylinder 43, on each side, is pressurized so as to counterbalance gravitational pull on lower platen 26. Additionally, or optionally, similar pneumatic cylinders can be added to the top platen in order to counterbalance gravitational pull on upper platen 24.

Figure 5:
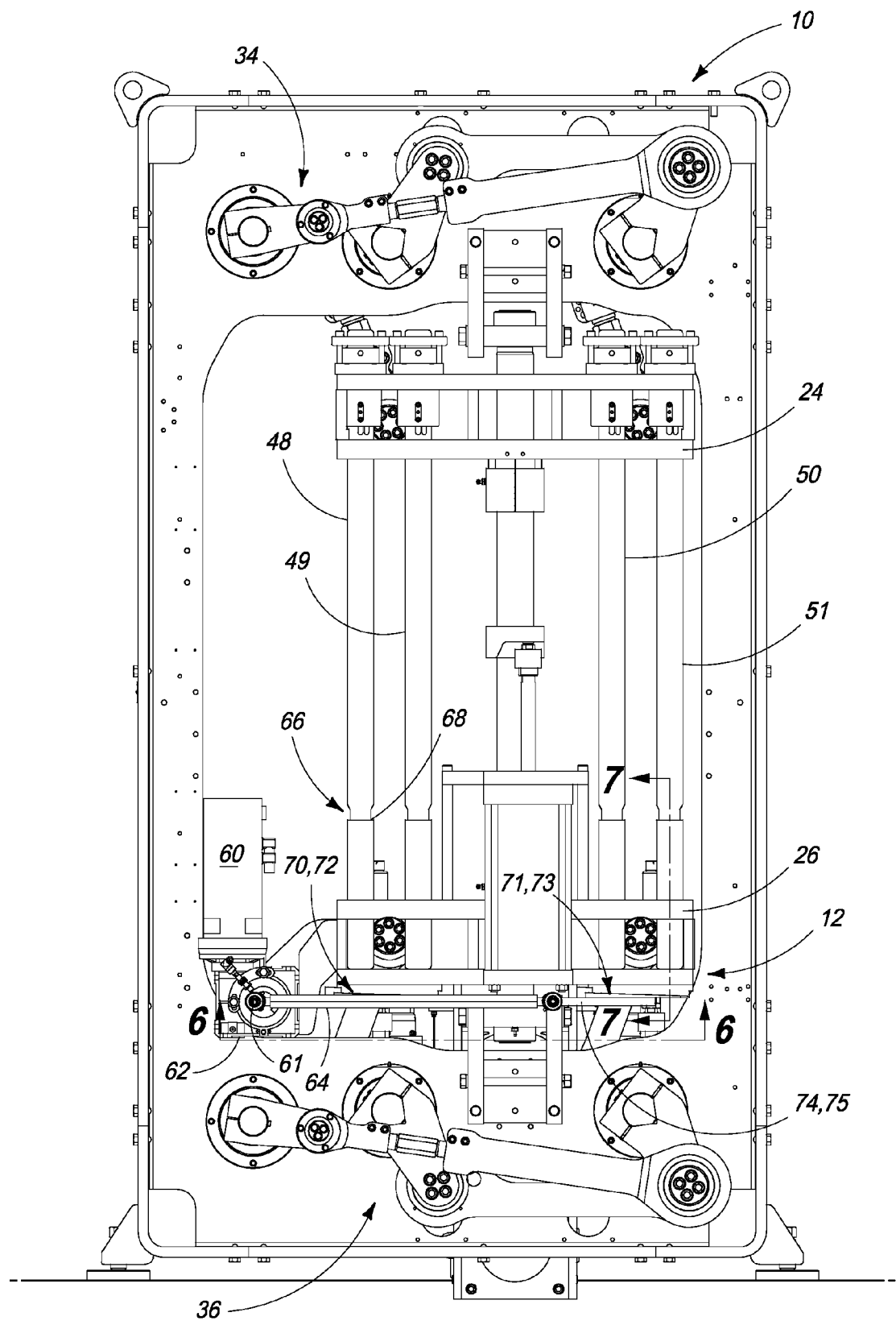
FIG. 5 is an elevational side view of the thermoforming machine of FIG. 3 showing the upper and lower platens unlocked and in a fully open, or separated position (but with the forming die plates omitted).
Figure 7:
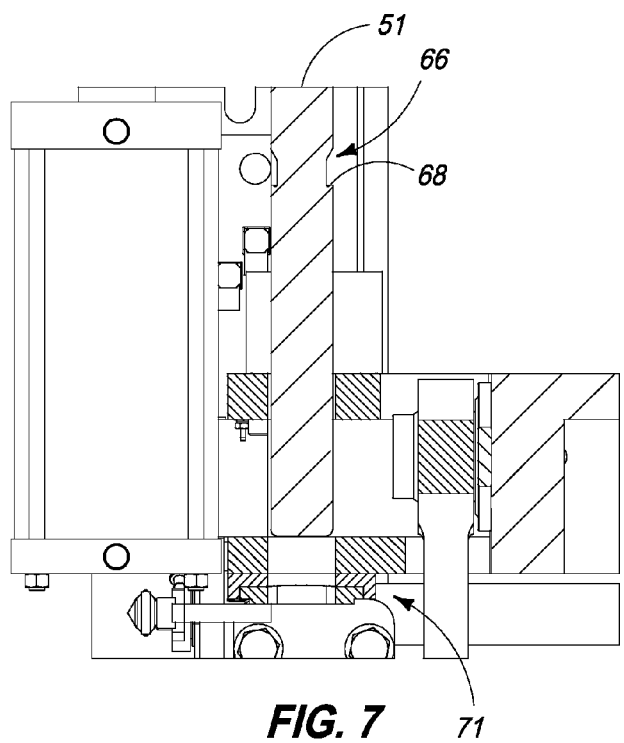
FIG. 7 is a component view taken along line 7-7 of FIG. 5 and showing one lock plate assembly and load shaft in an unlocked and separated position corresponding with separation of the upper platen and lower platen.
Figure 6:
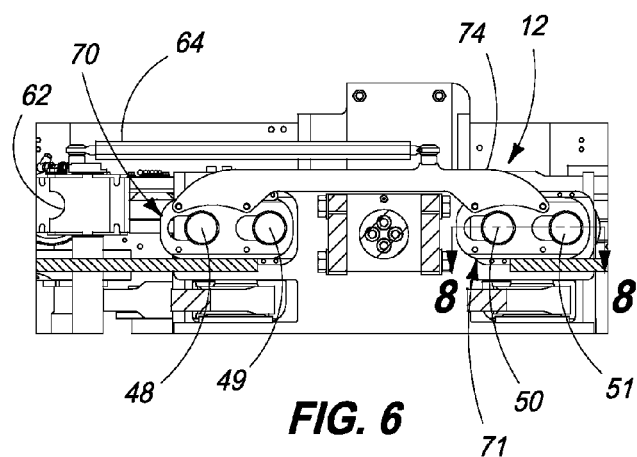
FIG. 6 is a component view from below taken along line 6-6 of FIG. 5 and showing one side of the platen lock assembly.
Figure 8:
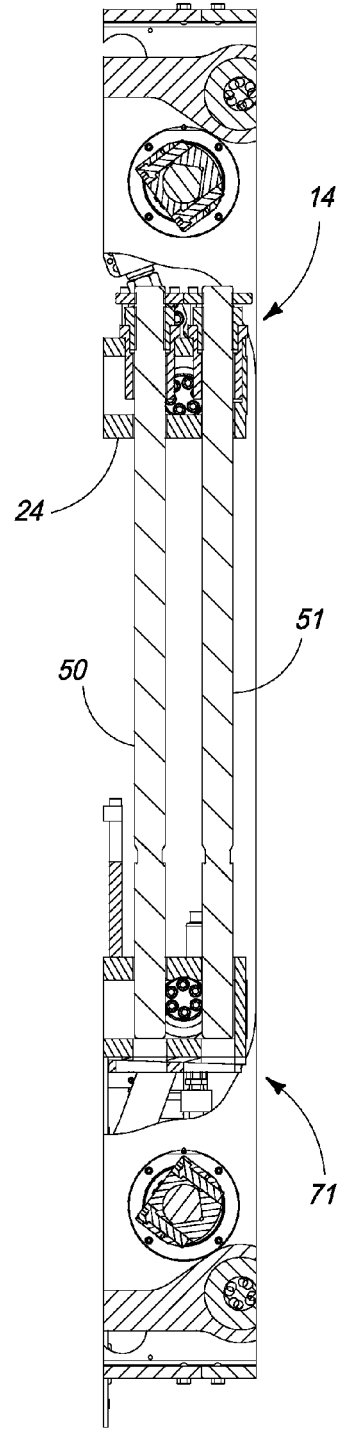
FIG. 8 is a vertical sectional component view taken along line 8-8 of FIG. 5 and showing a pair of load shafts and corresponding lock plate in the unlocked and separated position depicted in FIG. 7.

FIG. 5 illustrates platens 24 and 26 in a fully open state via positioning of kinematic linkages 34 and 36, with lock plate assemblies 70-73 of platen lock assembly 12 placed in an unlocked position via servo motor 60, shaft 61, gearbox 62, rods 64 and drive bars 74 and 75. FIG. 6 further illustrates the open, or unlocked position between load shafts 48-51 relative to lock plate assemblies 70 and 71. Likewise, FIG. 7 further illustrates the position of load shaft 51 relative to lock plate assembly 71 when unlocked with the platens opened (or moved apart), and showing reduced diameter portion, or lock ledge 66 having a horizontal engagement surface, or circumferential shelf 68. Furthermore, FIG. 8 shows load shafts 50 and 51 in the unlocked and open position relative to lock plate assembly 71, with lock ledges 66 raised relative to lock plate assembly 71.

Figure 9:
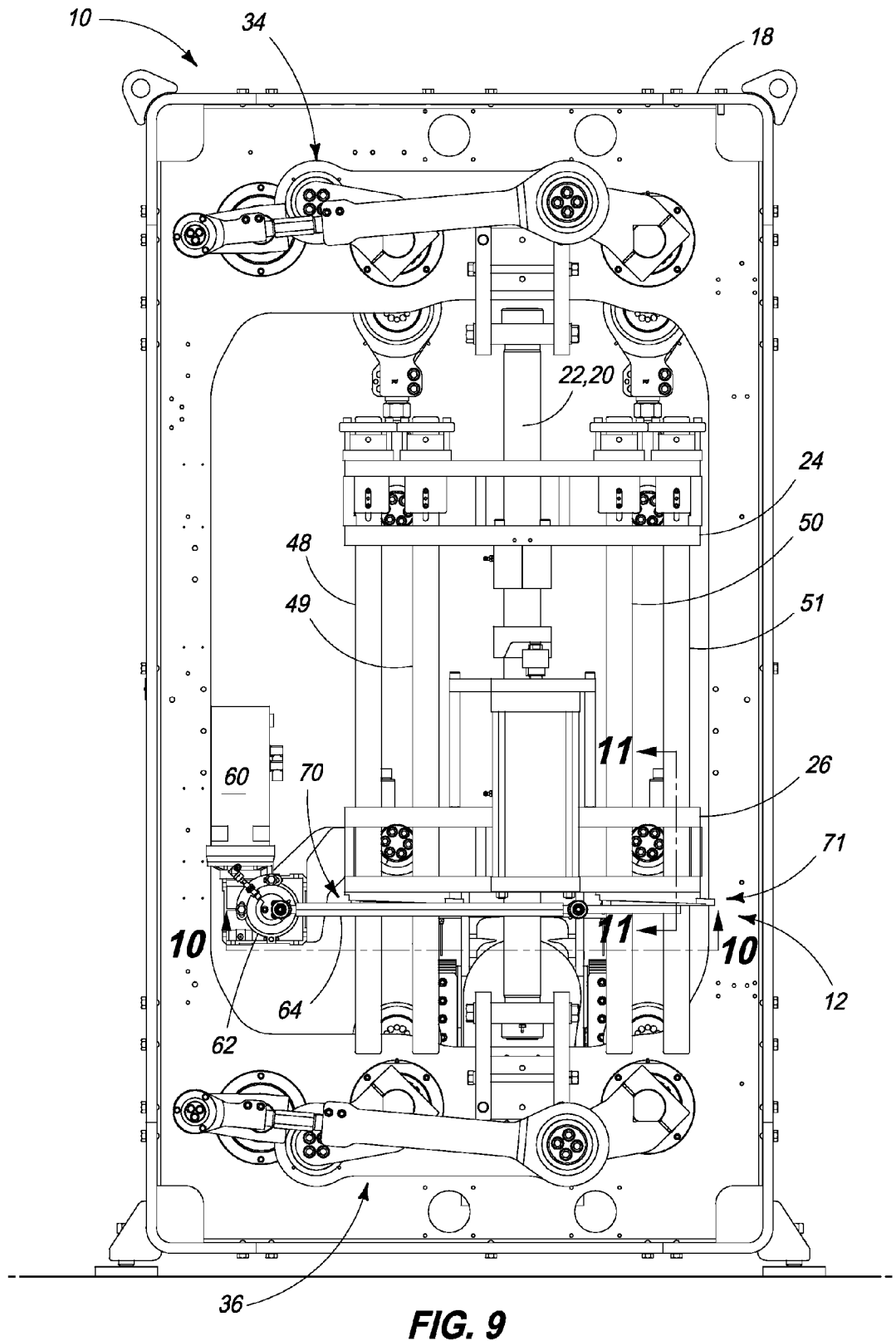
FIG. 9 is a vertical side view of the thermoforming machine of FIG. 3, but later in time and showing the upper platen lowered and the lower platen raised to positions that correspond with a position where die plates (not shown) would be fully engaged during a thermoforming operation.
Figure 13:
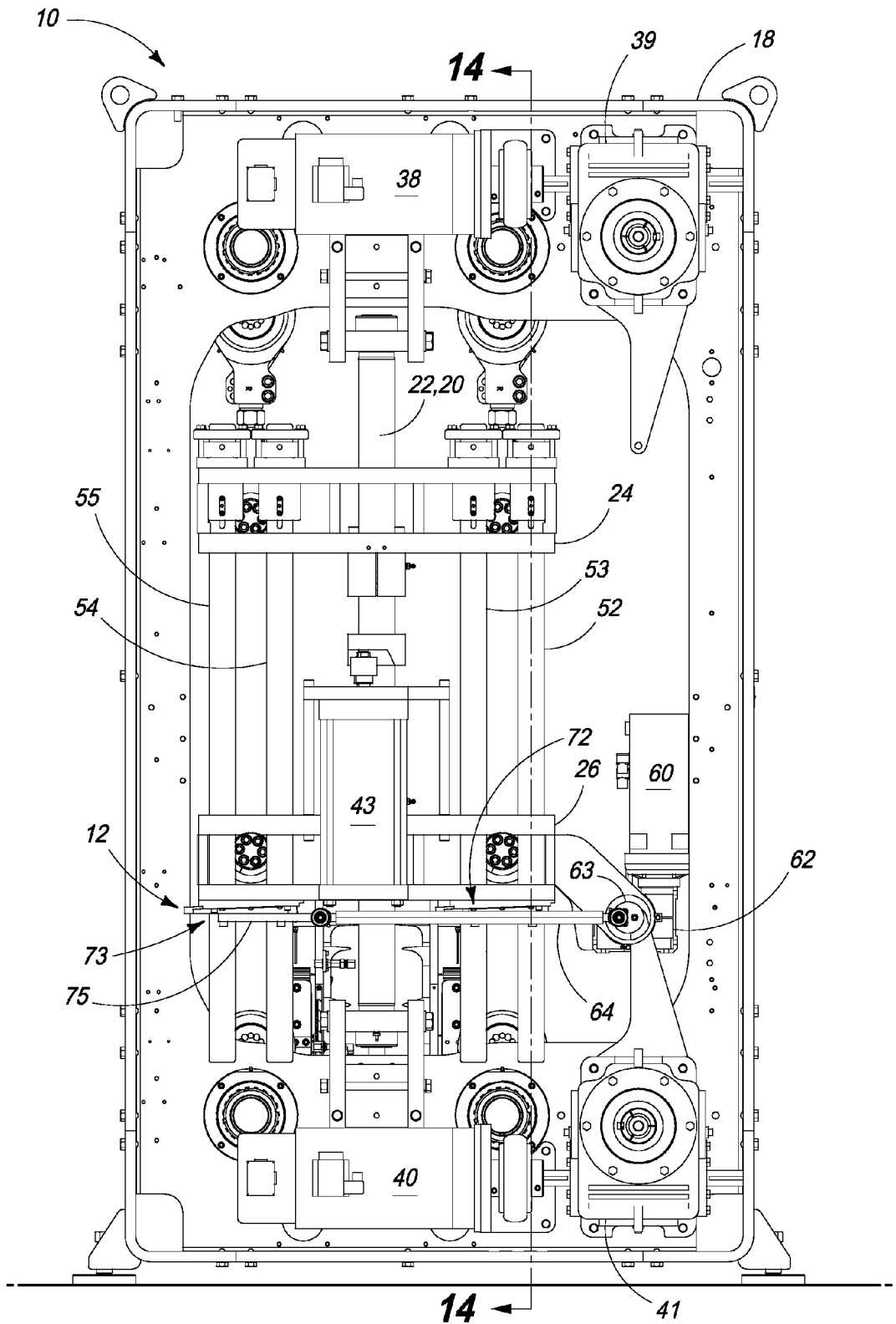
FIG. 13 is a vertical side view of the thermoforming machine taken on an opposite side of the view in FIG. 3 and corresponding with the same time and showing the upper platen lowered and the lower platen raised to positions that correspond with a position where die plates (not shown) would be fully engaged during a thermoforming operation.
Figure 15:
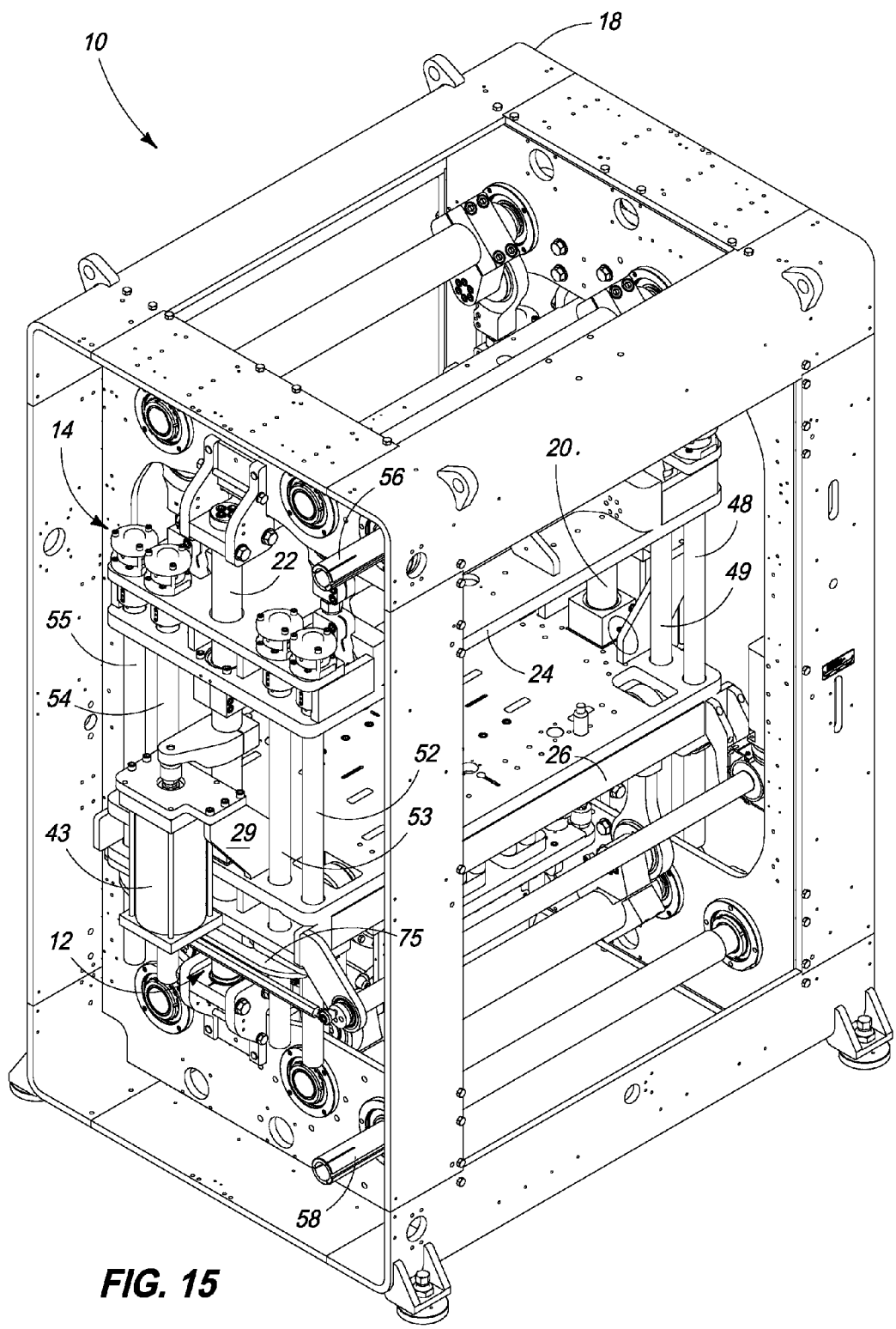
FIG. 15 is a perspective view from above of the thermoforming machine of FIG. 1 with upper and lower servo drive motors, gearboxes, and die plates removed.

FIGS. 9 and 15 illustrate thermoforming machine 10 on opposite sides, with FIG. 13 showing the configuration of servo motors 38 and 40 with respective gearboxes 39 and 41. An eccentric mount on each end of shaft 61 is positioned to place drive bars 74 and 75 in forward positions, locking each lock plate assembly 70-73 onto each respective load shaft 48-55. In such locked configuration, load shafts 48-55 counter, or resist, forming pressures imparted when applying vacuum and pressure to respective top and bottom surfaces of a thermoforming web during an article thermoforming operation.

Figure 11:
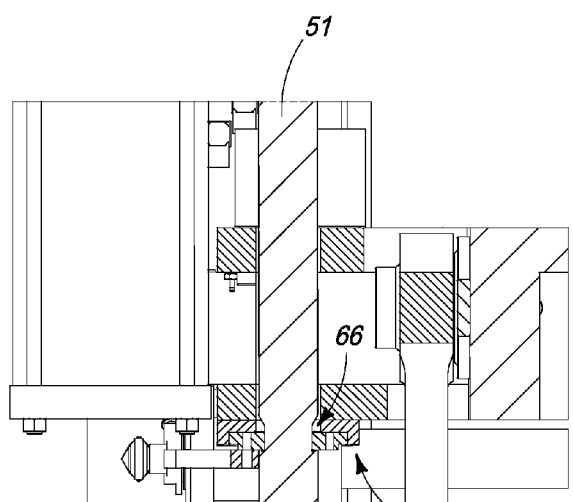
FIG. 11 is a component view taken along line 11-11 of FIG. 9 and showing one lock plate assembly and load shaft in a locked position corresponding with movement of the upper platen and lower platen to a position where die plates (not shown) would be fully engaged during a thermoforming operation.
Figure 10:
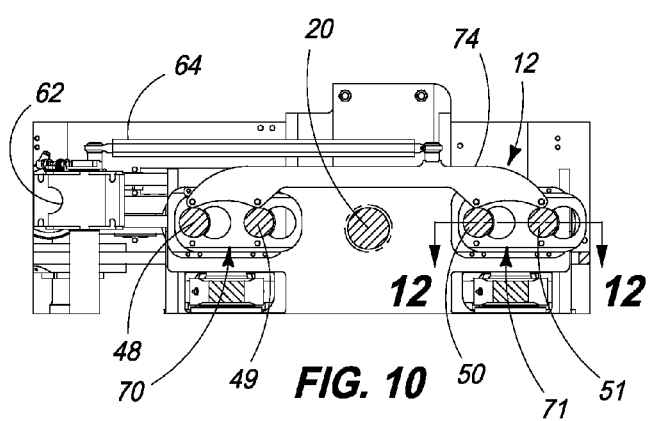
FIG. 10 is a component view from below taken along line 10-10 of FIG. 9 and showing one side of the platen lock assembly in a locked position.
Figure 12:
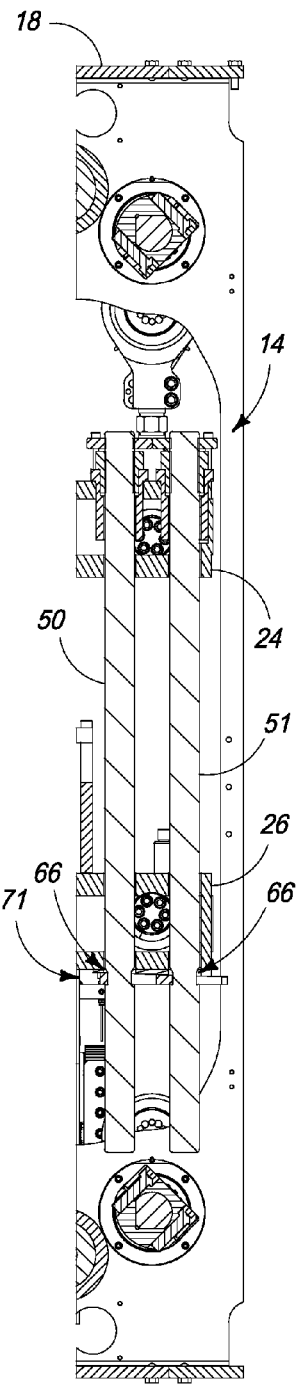
FIG. 12 is a vertical sectional component view taken along line 12-12 of FIG. 10 and showing a pair of load shafts and corresponding lock plate in the locked and closed together die position (die plates not shown) depicted in FIG. 9.

FIG. 10 depicts lock plate assemblies 70 and 71 in a locked position on load shafts 48-49 and 50-51, respectively. FIG. 11 further illustrates load shaft 51 secured by lock plate assembly 71 along lock ledge 66. Finally, FIG. 12 illustrates load shafts 50 and 51 locked by lock plate assembly 71 while platens 24 and 26 are held in a closed position corresponding with respective mold plates (not shown) being urged together in sealed relationship.

Figure 14:
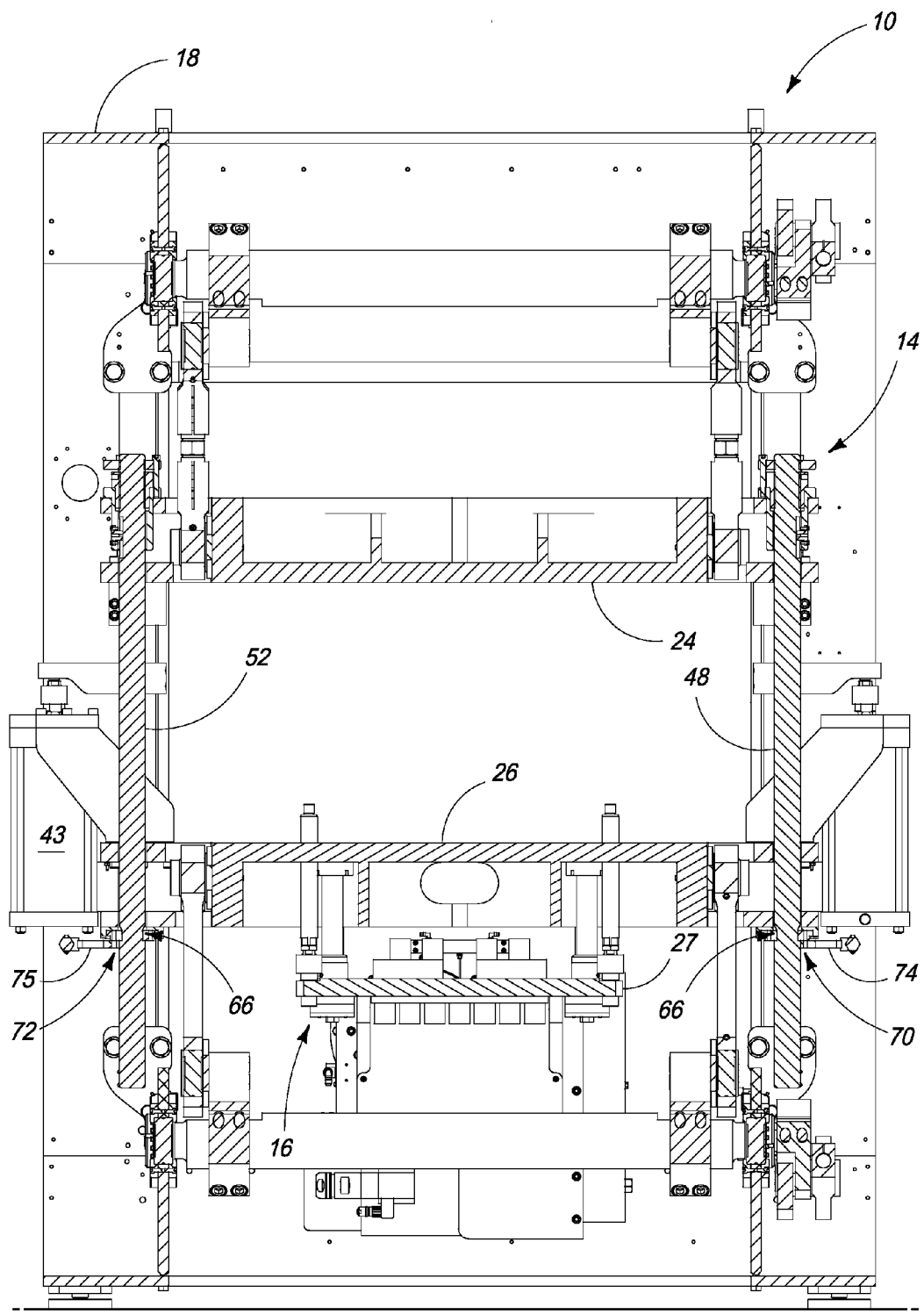
FIG. 14 is a vertical sectional view taken along line 14-14 of FIG. 13.

FIGS. 13 and 14 further illustrate platen lock assembly 12 of thermoforming machine 10 in a locked, or closed position. FIG. 14 depicts third motion plug assist drive assembly 16 in a retracted position, corresponding with male plugs retracted before they are extended into a web during a forming operation.

Figure 16:
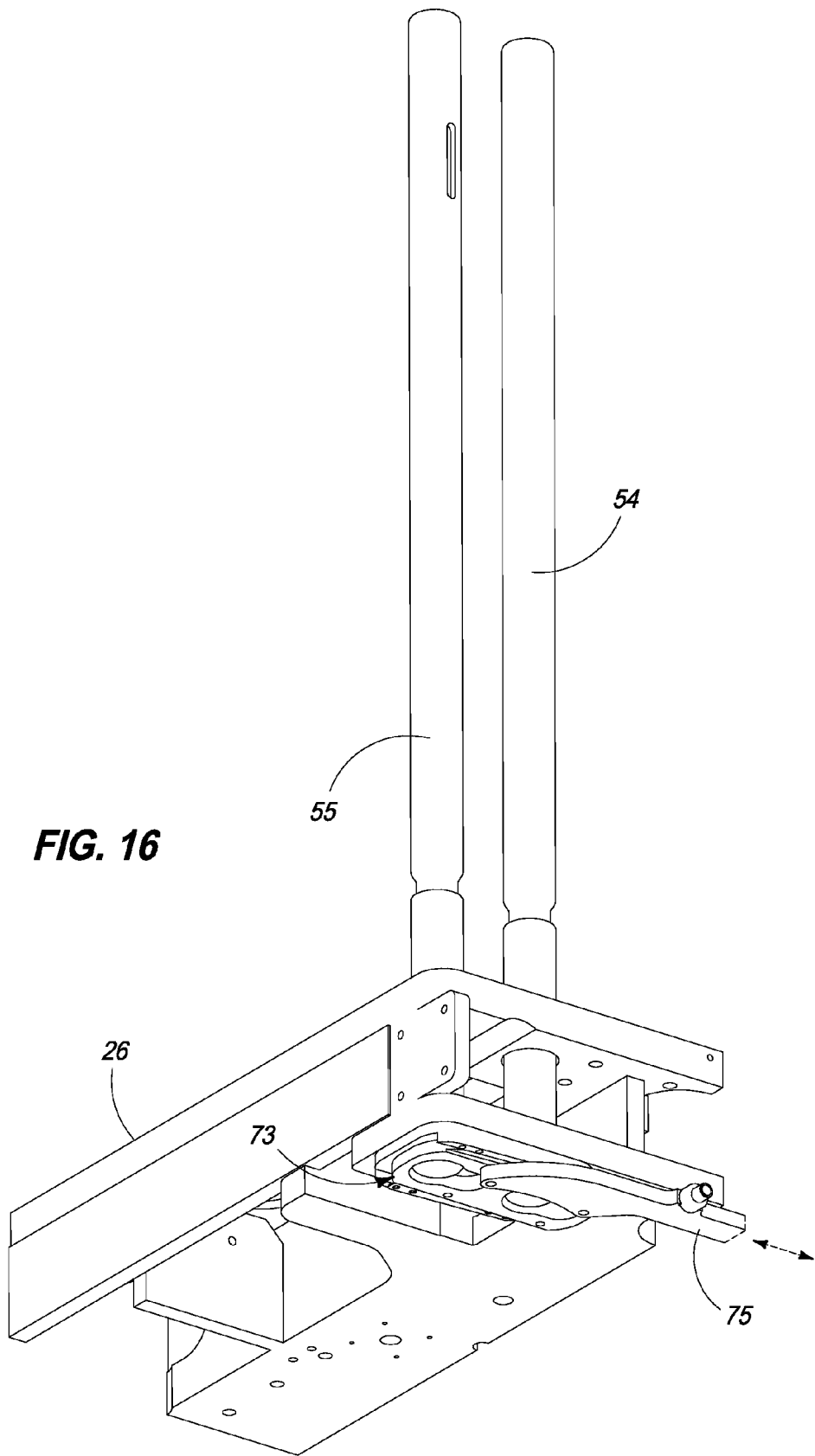
FIG. 16 is a fragmentary component perspective view of one corner of lower platen 26 with a respective pair of load shafts and lock plate assembly depicting the load shafts locked with the lock plate assembly corresponding with a closed platen position.
Figures 17, 18:
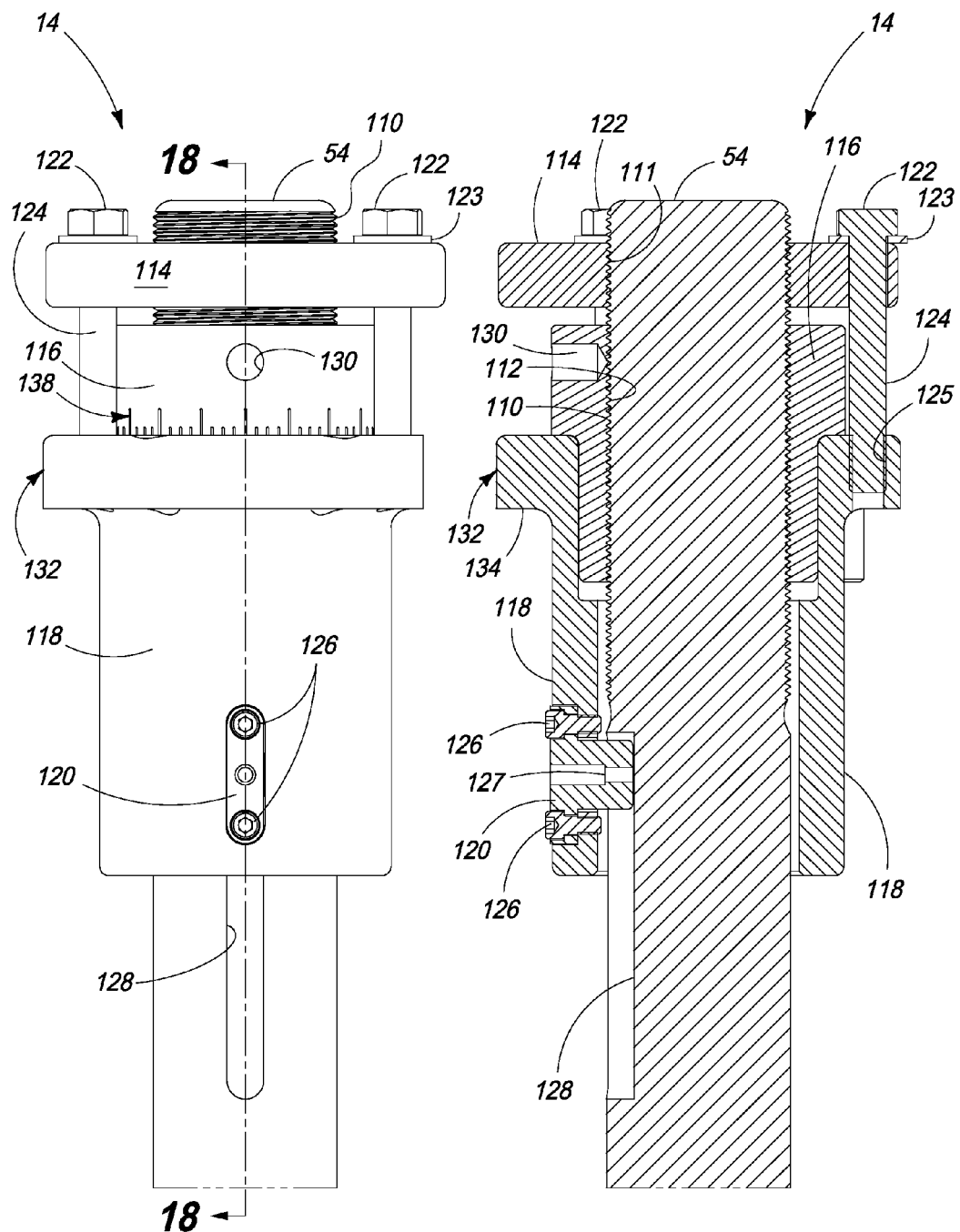
FIG. 17 is an enlarged view of a top end portion of the load shaft end adjustment assembly of FIGS. 1-2, 12 and 15.
FIG. 18 is a vertical sectional view taken along line 18-18 of FIG. 17.

FIG. 16 depicts in component view exemplary load shafts 54 and 55 in a locked position relative to lock plate assembly 73. FIG. 17 further illustrates the configuration of lock plate assembly 73 in a closed, or locked position relative to lock ledges 66 and circumferential shelves 68 on load shafts 54 and 55. A pair of apertures, or key slots 80 and 82 each have an elongate, narrow portion and an enlarged clearance portion. The narrowed portion locks onto lock ledges 66.

As shown in FIG. 16, lock plate assembly 73 comprises a stationary beveled clearance plate 76 and a movable beveled key plate 78. Plates 76 and 78 each have top and bottom surfaces that are beveled at 2 degrees such that motion of plate 78 relative to plate 76 increases and decreases total thickness of lock plate assembly 73. When locked, the total thickness increases. The ability to adjust thickness ensures that proper sealing occurs between the top and bottom mold plates when pressed together while applying vacuum and pressure. Threaded fasteners secure plate 76 to platen 26, while threaded fasteners secure retainer plates 84 and 86 onto plate 76. Finally, threaded fasteners 92 secure drive bar 75 onto plate 78. A pair of parallel elongate grooves 88 provide a sliding surface along plates 84 and 86, facilitating sliding to-and-fro of plate 78 relative to stationary plate 76 when locking and unlocking lock plate assembly 73 relative to load shafts 54 and 55.

FIG. 17 illustrates a thermoforming machine load shaft end adjustment apparatus 14 used on thermoforming machine 10 of FIGS. 1-16. More particularly, load shaft end adjustment apparatus 14 comprises a cylindrical backlash nut 114 that is received onto a threaded end portion of load shaft 54, a height adjustment nut 166 that is also received onto the same threaded end portion of load shaft 54, and a cylindrical collar 118 that receives a lower, reduced diameter portion of nut 116 for rotatable engagement. Nut 114 provides a structural support. Optionally, a structural support can be provided by any integrally formed, attached, or mounted frame member, arm, clamp, or suitable structural support provided on or adjacent the load shafts 54 that enables one to impart a preload to the adjustment nut and shaft so as to prevent thread wear during pneumatic loading and unloading. A plurality of circumferentially spaced apart threaded hex head bolts 122 and respective washers 123 are threaded into respective threaded bores in a radially outwardly extending flange of collar 118 for fixing the relative position of nut 114 and collar 118 when height adjustment nut 116 has been rotated to a desired threaded position along load shaft 54, using one of a circumferential array of radially extending bores 130 for receiving a turning tool, or shaft. A plurality of circumferentially spaced apart threaded hex head cap screws, or bolts (not shown) are received within respective bores 125 in a radially outwardly extending flange of collar 118. Flats 129 are provided on opposite sides of the flange of collar 118 to enable adjacent positioning together of adjacent pairs of assemblies 144 onto respective apertures within upper platen 14 (see FIG. 1). Alternatively, load shafts 54 can be mounted upside down (relative to what is shown in FIG. 1), between the upper and lower platen.

One or more of load shafts 54 can be adjusted in length in order to eliminate any pneumatic leakage between die plates during thermoforming. A visual inspection with feeler gauges can detect a local gap requiring one or more load shafts to be adjusted in length, when die plates are engaged together and a pneumatic source and/or vacuum are applied across the web (while engaged between the die plates and locked together with load shafts 54). An audible inspection can also be used in order to identify where pressurized air, or gas is leaking through a seal between engaged die plates, then adjacent load shafts can be adjusted in length so as to reduce or eliminate any leakage of pneumatic air/vacuum during a thermoforming operation.

Figure 19:
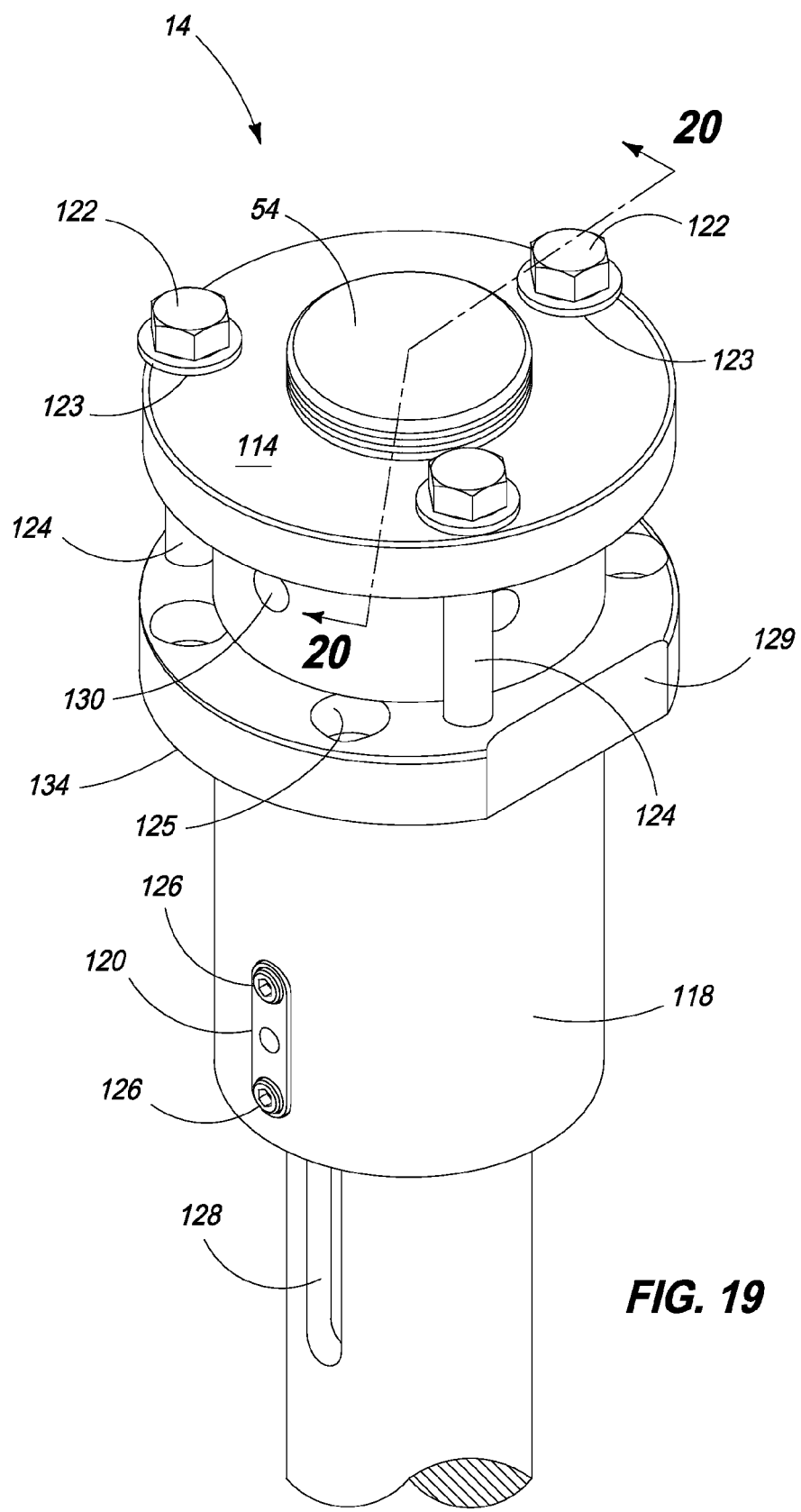
FIG. 19 is an enlarged perspective view of the load shaft end adjustment assembly of FIGS. 17-18.

As shown in FIGS. 17-19, a key 120 is affixed into a receiving aperture in collar 118 using a pair of threaded machine screws, or bolts 126. Key 120 includes a radially extending threaded bore 127 provided to receive a threaded tool end (not shown) used to extract key 120 during assembly and disassembly. Key 120 is received in axially sliding relation within key slot 128 in assembly in order to ensure that nut 114, nut 116, and collar 118 do not rotate relative to load shaft 54 when secured and tightened together in a desired position via bolts 122. In this manner, nut 116 is rotated via bore 130 (using a cylindrical rod tool) to a desired threaded position along load shaft 54 in order to impart a desired length to assembly 14 by nut 114, nut 116, and collar 118, after which bolts 122 are tightened in order to retain the desired combined length of assembly 14. A scale 138 extends around a circumferential outer surface of collar 118 to enable determination of relative rotation of nut 116 and collar 118 via a reference mark, or notch (not shown) atop collar 118. According to one construction, load shaft 54 is threaded from a distal end to a topmost portion of a key slot 128 on load shaft 54 by a continuous thread segment 110 that is complementary to respective threaded female thread segments 111 and 112 within nuts 114 and 116, respectively.

Figure 20:
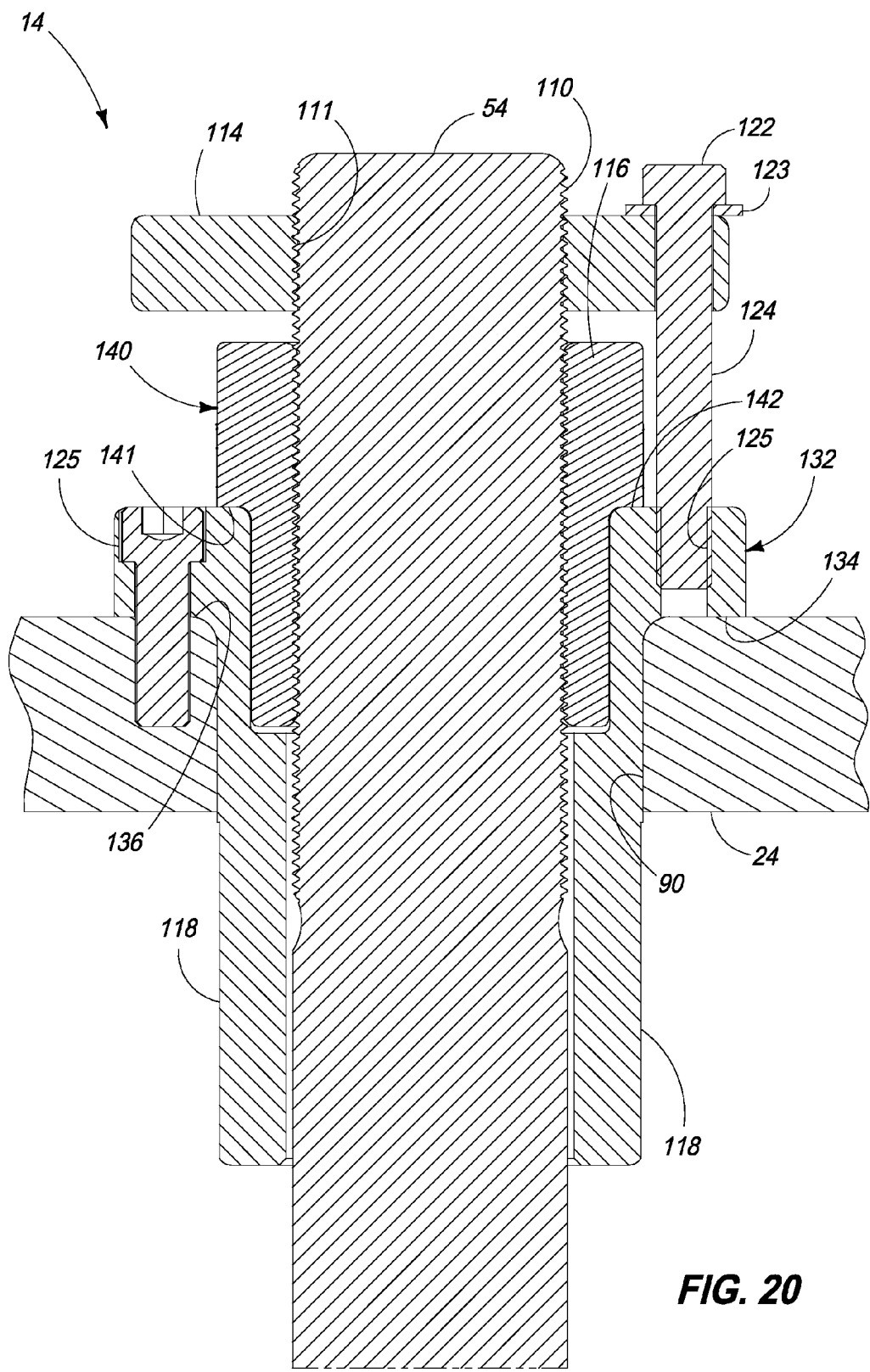
FIG. 20 is a vertical sectional view taken along line 20-20 of FIG. 19.

As shown in FIG. 20, a circumferential array of threaded fasteners, or bolts 125 secure collar 118 to platen 24 within bore 90. More particularly, a circumferential shoulder 134 of flange 132 seats against a complementary shoulder 136 on platen 24. In order to eliminate cyclical loading between threads 110 and threads 111 and 112, fasteners 122 are torqued to a level that forces a shoulder 141 on nut 116 into forceable engagement with a shoulder 142 on cylindrical collar 118. Bolts 122 are torqued to a level that generates an axial force between nut 116 and collar 118 that exceeds any axial load on shaft 54 that is generated during a thermoforming cycle. This preload (above maximum shaft loads) prevents any "erosion" between threads 110 and threads 111 and 112 due to movement there between, which would result in wear and damage to the threads, and eventually failure of the structural integrity. Accordingly, the load shaft adjustment apparatus 14 is a preloaded assembly that enables lengthening and shortening of shaft 54 on a thermoforming machine in order to get good fit-up, or sealing between die assemblies of platens. In one case, bolts 122 are torqued to 80 ft. lbs., and bolt 122 is a Grade 8 bolt. In such one exemplary case, the die plates seal together an area 50" by 50", and a differential pneumatic forming pressure of 120 psi will impart 150 tons of load to the load shafts. Larger areas are also possible, requiring greater torque on bolts 122. Smaller areas are also possible.

According to one implementation, a method is provided for adjusting lengths of load shafts on a platen of a thermoforming apparatus. The method includes providing: a first platen with a first die mold, a second platen with a second die mold, a drive linkage for moving together and apart the first platen and the second platen, and a plurality of load shafts extending between the first platen and the second platen operative to secure together under thermoforming loads the first die mold and the second die mold during a thermoforming operation; urging together the first platen and the second platen such that the first die mold and the second die mold are held together in engagement; ascertaining any loose fit-up along respective die surfaces between the first die mold and the second die mold; and adjusting length on one of the load shafts to eliminate the ascertained loose fit-up between the first die mold and the second die mold when the die molds are held together in engagement.

According to another implementation, a method is further provided for adjusting lengths of load shafts on a platen of a thermoforming apparatus, or machine. A first load shaft is adjusted in length while molds on dies of a thermoforming machine are held together in engagement. A second load shaft, spaced apart from the first load shaft is also adjusted in length while the molds are held together in engagement. Subsequent load shafts are also adjusted in length so as to ensure sealing fit-up of a seal that is interposed between the mating molds on each of a pair of platens on the thermoforming machine.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A thermoforming machine load shaft length adjustment apparatus, comprising:
   a load shaft having a threaded segment, the load shaft configured to engage between a pair of thermoforming platens of a thermoforming machine and carry forming loads between the pair of platens during a thermoforming operation;
   a structural support provided on the load shaft proximate the threaded segment;
   a length adjustment nut threaded onto the threaded segment of the load shaft proximate the structural support and movable to effect length adjustment of the load shaft as engaged between the pair of platens;
   a collar mounted onto a platen of the thermoforming machine and configured to receive the length adjustment nut for relative rotation; and
   at least one fastener extending between the structural support and the collar and configured to secure together the structural support and the collar with the length adjustment nut interposed there between and engaged in threaded relationship to impart a preload that urges the height adjustment nut against the collar that is greater than a load received by the load shaft as thermoforming pressure is applied between the platens.

2. The thermoforming machine load shaft end adjustment apparatus of claim 1, further comprising a backlash nut threaded onto the threaded segment of the load shaft and configured to provide the structural support.

3. The thermoforming machine load shaft length adjustment apparatus of claim 2, wherein the at least one fastener is received through a bore in the backlash nut and threads into engagement with the collar, drawing the collar into forcible abutting relation with the length adjustment nut so as to load threads of the adjustment nut with threads of the load shaft to provide a structural preload.

4. The thermoforming machine load shaft length adjustment apparatus of claim 3, wherein the at least one fastener is tightened sufficient to apply a preload that exceeds a maximum operating load of the load shaft during a cycle load of a thermoforming operation.

5. The thermoforming machine load shaft length adjustment apparatus of claim 1 wherein the load shaft further comprises an axially extending key slot and the collar further comprises a key configured to be received within the key slot.

6. The thermoforming machine load shaft length adjustment apparatus of claim 1, wherein the length adjustment nut is rotated in threaded engagement along the threaded segment of the load shaft to lengthen and shorten effective length of the load shaft when engaged between a first platen and a second platen.

7. The thermoforming machine load shaft length adjustment apparatus of claim 6, wherein the length adjustment nut comprises a circumferential array of radially extending bores each configured to receive a complementary drive shaft of a turning tool operative to rotate the adjustment nut relative to the load shaft.

8. The thermoforming machine load shaft length adjustment apparatus of claim 7, wherein the length adjustment nut further comprises a radially outwardly extending flange providing a cylindrical shoulder configured to engage a complementary shoulder on the collar.

9. A length-adjustable thermoforming machine load shaft apparatus, comprising:
   a load shaft having a threaded segment and spaced-apart engagement portions for releasably engaging together a pair of thermoforming platens of a thermoforming machine and operative to carry pneumatically-induced thermoforming loads imparted between forming dies on the pair of platens during a thermoforming operation;

a load-bearing support provided on the load shaft proximate the threaded segment;

an adjustment nut threaded onto the threaded segment proximate the load-bearing support and movable to effect length adjustment of the load shaft as engaged between the pair of platens;

a collar mounted onto a platen of the thermoforming machine and configured to mate in engagement with the adjustment nut; and a preload fastener extending between the structural support and the collar and configured to draw together the structural support and the collar so as to urge the collar into engagement with the adjustment nut so as to preload threads on the adjustment nut with complementary threads on the load shaft such that the resulting preload is greater than a load received by the load shaft as forming pressure is applied between the platens.

10. The thermoforming machine load shaft length adjustment apparatus of claim 9, wherein the load shaft comprises an engagement surface spaced from the threaded segment and configured to lock and unlock with a lock plate assembly that secures together and releases the thermoforming platens to sealingly engage and disengage respective forming dies on the platens during a cyclical thermoforming operation.

11. The thermoforming machine load shaft length adjustment apparatus of claim 9, wherein the adjustment nut comprises a cylindrical plate having a central threaded bore with threads complementary with the threaded segment of the load shaft.

12. The thermoforming machine load shaft length adjustment apparatus of claim 11, wherein the cylindrical plate comprises a circumferential array of equally spaced-apart through bores extending through the plate, each bore configured to receive one of a plurality of the preload fasteners, each fastener configured to be received in a respective threaded bore in the collar.

13. The thermoforming machine load shaft length adjustment apparatus of claim 12, wherein the collar comprises a cylindrical collar having a circumferentially radially outwardly extending flange providing a cylindrical abutment shoulder configured to be assembled to one of the platens.

14. The thermoforming machine load shaft length adjustment apparatus of claim 13, wherein a circumferential array of equally spaced-apart through bores are provided in the flange, each bore configured to receive a fastener to secure the collar to the platen.

15. The thermoforming machine load shaft length adjustment apparatus of claim 14, wherein a circumferential array of equally spaced-apart threaded bores are provided in the flange, each threaded bore configured to receive a respective one of a plurality of the preload fastener.

16. The thermoforming machine load shaft length adjustment apparatus of claim 15, wherein each of the preload fasteners comprises a threaded bolt configured for complementary threaded engagement within a respective one of the threaded bores.

17. A thermoforming machine load shaft apparatus, comprising:

a load shaft having a length adjustment segment, the load shaft configured to engage between a pair of thermoforming platens of a thermoforming machine to carry forming loads between the pair of platens during a thermoforming operation;

a first structural support provided on the load shaft at a first location configured to mate with a first platen of the pair of platens; and a second structural support provided on the load shaft at a second location configured to mate with a second platen of the pair of platens and spaced from the first location with the length adjustment segment provided between the first location and the second location.

18. The thermoforming machine load shaft apparatus of claim 17, wherein the length adjustment segment of the load shaft comprises a preloaded compression mechanism.

19. The thermoforming machine load shaft apparatus of claim 17, wherein the length adjustment segment comprises a threaded segment provided on the load shaft and a length adjustment nut threaded onto the threaded segment of the load shaft proximate the first structural support and movable to effect length adjustment of the load shaft as engaged between the pair of platens.

20. The thermoforming machine load shaft apparatus of claim 19, further comprising a collar mounted onto a platen of the thermoforming machine and configured to receive the length adjustment nut for relative rotation.

* * * * *